US009763026B2

(12) United States Patent
Griesmann et al.

(10) Patent No.: US 9,763,026 B2
(45) Date of Patent: Sep. 12, 2017

(54) METHOD OF AND SERVER FOR COMMUNICATING WITH A REMOTE DEVICE IN A MACHINE TO MACHINE WIRELESS COMMUNICATION NETWORK

(71) Applicant: MOTOROLA SOLUTIONS, INC., Schaumburg, IL (US)

(72) Inventors: Daniel S. Griesmann, Villa Park, IL (US); Randy L. Ekl, Lake Zurich, IL (US); Charles E. Spengler, Hoffman Estates, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 162 days.

(21) Appl. No.: 14/735,857

(22) Filed: Jun. 10, 2015

(65) Prior Publication Data

US 2016/0366534 A1    Dec. 15, 2016

(51) Int. Cl.
  *H04L 12/28* (2006.01)
  *H04W 4/00* (2009.01)
  *H04W 8/22* (2009.01)
  *H04L 29/06* (2006.01)

(52) U.S. Cl.
  CPC ............. *H04W 4/005* (2013.01); *H04L 67/42* (2013.01); *H04W 8/22* (2013.01)

(58) Field of Classification Search
  CPC ........ H04L 67/42; H04W 4/005; H04W 8/22; H04W 84/18
  USPC ......................................................... 370/254
  See application file for complete search history.

(56) References Cited

U.S. PATENT DOCUMENTS

| 7,143,191 B2 | 11/2006 | Chuah et al. |
| 7,817,630 B2 | 10/2010 | Foti |
| 7,983,301 B2 | 7/2011 | Li |
| 8,572,218 B2 | 10/2013 | Narayanan et al. |
| 8,935,752 B1 * | 1/2015 | Chen ....................... G06F 21/00 726/1 |
| 2007/0198505 A1 * | 8/2007 | Fuller ................. G06F 17/3087 |
| 2009/0285492 A1 * | 11/2009 | Ramanujapuram ....................... G06F 17/30247 382/209 |

(Continued)

FOREIGN PATENT DOCUMENTS

| WO | 2008004147 | 1/2008 |
| WO | 2013163818 | 11/2013 |

*Primary Examiner* — Chi H Pham
*Assistant Examiner* — Alexander O Boakye
(74) *Attorney, Agent, or Firm* — Michael Best & Friedrich LLP (57) ABSTRACT

A server that communicates with a remote device in a machine to machine wireless communication network. The server includes an input/output interface, a processor, and a memory. The memory stores a context-aware dictionary manager executable by the processor, and a contextual correlations database having a plurality of correlations. The context-aware dictionary manager is configured to establish a current context associated with the remote device, search the contextual correlations database using the current context, identify a correlation match with the current context and one of the plurality of correlations, and communicate, via the input/output interface, the entry associated with the correlation match to the remote device for adding to a dictionary at the remote device. Also disclosed is a method of finding and maintaining correlations in the machine to machine system.

18 Claims, 7 Drawing Sheets

(56) References Cited

U.S. PATENT DOCUMENTS

2012/0296983 A1 11/2012 Boehm
2014/0189488 A1 7/2014 Tummalapenta et al.

* cited by examiner

METHOD OF AND SERVER FOR COMMUNICATING WITH A REMOTE DEVICE IN A MACHINE TO MACHINE WIRELESS COMMUNICATION NETWORK

BACKGROUND OF THE INVENTION

Land mobile radio (LMR) typically uses low capacity data links in machine to machine (M2M) communications. For example, a machine to machine solution may use a low capacity data link to transport data between a server and a remote modem device. The remote modem device may be connected to one or more sensors and/or one or more actuators. The server, low capacity data link, and remote modem device may be part of an enterprise scale machine to machine system, such as energy, transit, or public works, where integrity and timely delivery of data are paramount.

Accordingly, there is a need for a new and useful machine to machine system using dictionaries for lossless communication. More specifically, there is a need for a new and useful server and related operation that communicates with a remote modem device in the machine to machine wireless communication network.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the invention so as not to obscure the disclosure with details that will be readily apparent to those of ordinary skill in the art having the benefit of the description herein.

DETAILED DESCRIPTION OF THE INVENTION

Low capacity land mobile radio data links can be used for communicating data in a machine to machine system, such as an enterprise scale machine to machine system. In some embodiments, the machine to machine system can reduce the size of the data payloads that are communicated over channels, including the low capacity land mobile radio data links, between nodes (e.g., devices and servers) of the system.

In some embodiments, a server communicates with a remote device in a machine to machine wireless communication network. The server includes an input/output interface, a processor, and a memory storing a context-aware dictionary manager executable by the processor. The memory further includes a contextual correlations database having a plurality of correlations, each correlation of the plurality of correlations including an entry and a context associated with the entry. The context-aware dictionary manager is configured to establish a current context associated with the remote device, search the contextual correlations database using the current context, identify a correlation match with the current context and one of the plurality of correlations, and communicate, via the input/output interface, the entry associated with the correlation match to the remote device for adding to a dictionary at the remote device.

The current context can include one or more selected from the group consisting of a type of sensor attached to the first remote device, environmental information related to a sensor, a type of actuator connected to the first remote device, environmental information related to an actuator, time information related to a sensor acquiring a sensed parameter, time information related to an actuator providing an output, a model of sensor, a model of actuator, a number of sensors connected to a remote device, a number of actuators connected to a remote device, a role of a sensor, a role of an actuator, a location of a sensor, and a location of an actuator.

In some embodiments, the establishing the current context includes receiving, via the input/output interface, contextual information including a contextual variable from the remote device, and the current context includes the contextual variable. Each entry of the plurality of correlations can include a respective identifier and a respective definition. The communicating the entry can include communicating, via the input/output interface, an identifier and a definition associated with the correlation match to the remote device for adding to the dictionary at the remote device. The entry can be used by the remote device for communicating with another device.

In some embodiments, the server communicates with a plurality of first remote devices, and each of the plurality of first remote devices include a first dictionary, respectively, and the server further includes a dictionary database having a plurality of second dictionaries, wherein each second dictionary of the plurality of second dictionaries is associated with one of the first dictionaries, respectively, of the plurality of first remote devices. The context-aware dictionary manager can be further configured to update one of the plurality of second dictionaries with the entry, where the updated one of the plurality of second dictionaries is associated with the dictionary of the remote device.

In some implementations, the remote device is associated with a link including the remote device and a second device, and the context-aware dictionary manager is further configured to communicate, via the input/output interface, the entry to the second device for adding to a second dictionary at the second device.

Also, the context-aware dictionary manager can be further configured to acquire information from a second remote device via the input/output interface, the information including a second contextual variable, and update the contextual correlations database with the contextual variable and a related second entry. The context-aware dictionary manager can be further configured to process a second entry from the dictionary to find a correlation with the second entry among a set of contextual variables.

In further embodiments, the context-aware dictionary manager is configured to update the contextual correlations database when the correlation is a significant correlation.

In at least one embodiment, a machine to machine communication network includes the server of and the remote device, where the remote device includes a remote modem device having at least one selected from the group consisting of a sensor and an actuator. The remote modem device and the server can communicate over a channel including a one-to-one low-capacity wireless data link.

In other implementations, embodiments provided a method of finding and maintaining correlations in a machine to machine system having a server, a first remote device, and a second remote device. The server implements a context-aware dictionary manager. The method includes identifying an entry to process, comparing the entry with first contextual information associated with the first remote device and second contextual information associated with the second remote device, finding a correlation among the entry, the first contextual information, and the second contextual information, determining a correlation strength indicator for the correlation; and updating a contextual correlations database based on the correlation strength indicator The comparing the entry can include further comparing the entry with system configuration information, and the finding a correlation includes further finding the correlation with the system configuration information.

In further implementations the finding a correlation includes finding the correlation among respective dictionaries of the remote devices.

In yet further implementations, the method includes identifying a change to a contextual variable, identifying a correlation involving the change in the contextual correlations database, identifying a dictionary involving the correlation, and updating the dictionary based on the change. When the correlation strength indicator meets the strength criteria, the method can determine whether a dictionary has the correlation and adding an entry related to the correlation.

Embodiments can determine whether the correlation strength indicator meets strength criteria to remove an entry, and when the correlation strength indicator meets the strength criteria to remove the entry, determining whether a dictionary has an entry for the correlation and removing the entry related to the correlation.

Figure 1:
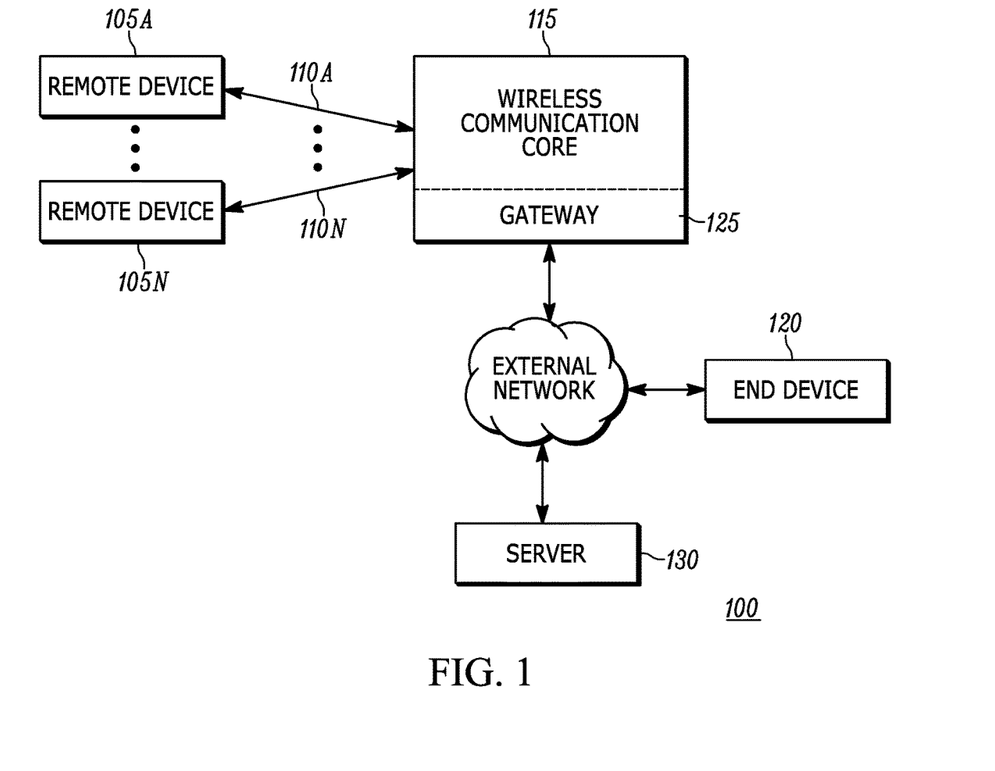
FIG. 1 is a block diagram of a machine to machine system in accordance with some embodiments.

FIG. 1 shows a block diagram of a machine to machine system 100 incorporating aspects of certain embodiments. The machine to machine system 100 includes a remote device 105A, a wireless data link 110A, and a wireless communication core 115. For a specific construction, the remote device 105A is a remote modem device, which will be further discussed below. However, it is envisioned that the remote device can be another device capable of communicating with a second machine or second electronic device. The remote devices may also be referred to herein as nodes, clients, or subscribers. For a specific construction, the second machine is a server, which will be further discussed below. FIG. 1 also shows the system 100 including a plurality of remote devices 105A . . . 105N in communication with the wireless communication core 115 over a plurality of wireless data links 110A . . . 110N. It is envisioned that each remote device 105A . . . 105N may be substantially similar, such as similar to the remote modem devices to be discussed below, or may be different, such as one of the remote devices being a remote modem device and another one of the remote devices being a mobile telephone or a mobile station.

Each remote device 105A . . . 105N is shown in FIG. 1 as having a respective data link 110A . . . 110N for communication with the wireless communication core 115. A data link, e.g. data link 110A, may take the form of a channel, may be within a single channel having multiple data links, or may encompass multiple channels. For example, a first remote device 105A may communicate with a second remote device 105N via the wireless communication core 115, e.g., via a repeater of the wireless communication core 115. Under this scenario what is shown as wireless data links 110A and 110N is part of a single channel. It is also envisioned that the channel from remote device 105A to remote device 105N can be through wired portions of the machine to machine system 100, e.g., as part of or connected to wireless communication core 115. For a specific construction, the data links 110A and 110N are low capacity land mobile radio data links. As used herein, a low capacity data link is considered to be communicating data at a rate less than 48 kilobits per second (kbps). In a more detailed construction, the low capacity data link is communicating at a rate less than 24 kilobits per second. In yet another detailed construction, the low capacity data link is communicating at a rate less than 9.6 kilobits per second.

The wireless communication core 115 provides the wireless infrastructure for communication among the remote devices 105A . . . 105N. The wireless communication core 115 provides other infrastructure for communication with other electronic devices via a gateway 125. In a more detailed construction, which is discussed below, the wireless communication core 115 is a land mobile radio core, which can include a repeater, a switch or router, a controller, an application server, a console, and a gateway, among other possible devices. Through the use of the gateway 125, the wireless communication core can communicate with an external end device 120 and/or an external server 130.

Figure 2:
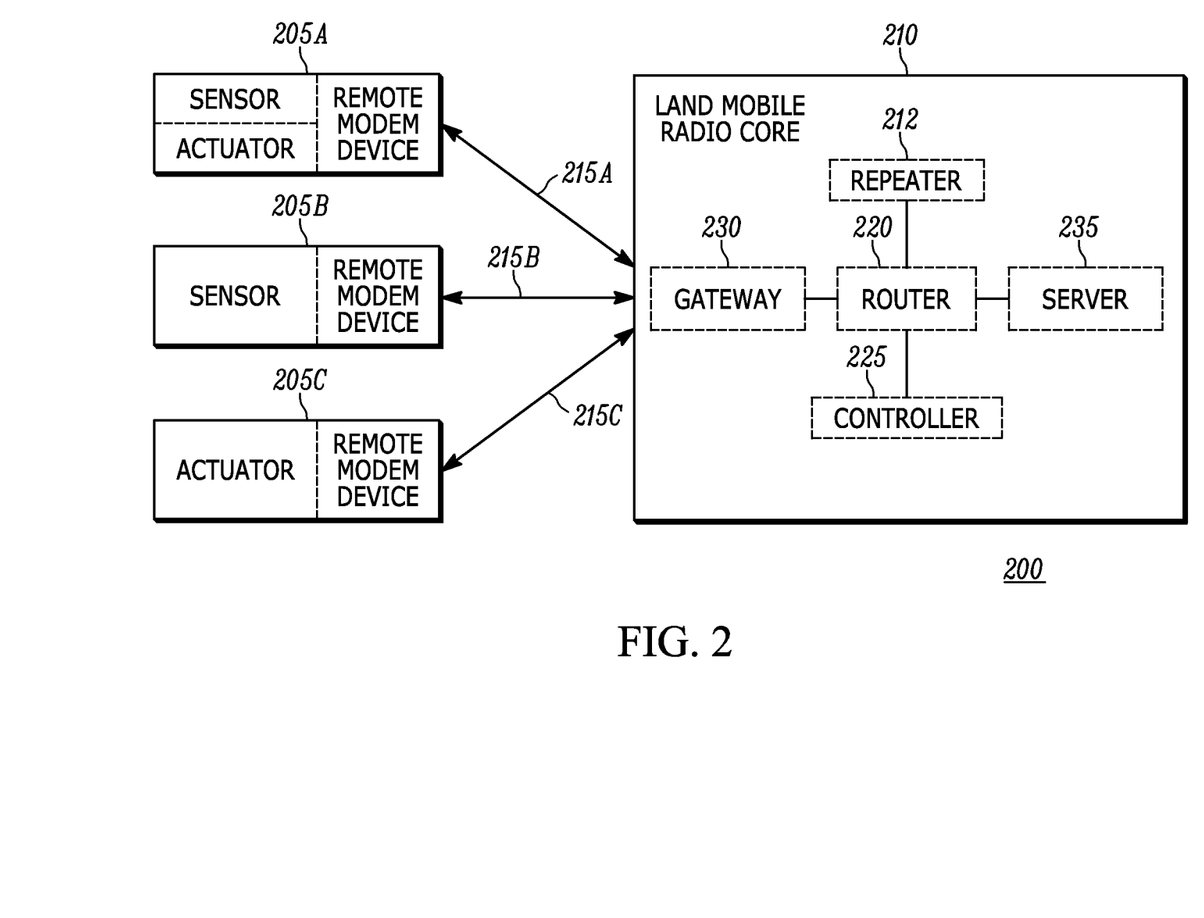
FIG. 2 is a block diagram of a second machine to machine system in accordance with some embodiments.

FIG. 2 shows a more specific implementation of a machine to machine system, which is a land mobile radio system 200, for incorporating aspects of the invention. FIG. 2 shows first 205A, second 205B, and third 205C remote modem devices in communication with a land mobile radio core 210 server via first 215A, second 215B, and third 215C low capacity data links. The first 205A, second 205B, and third 205C remote modem devices can be examples of the remote devices 105 shown in FIG. 1. The first 215A, second 215B, and third 215 low capacity data links can be examples of the data links 110 shown in FIG. 1. The land mobile radio core 210 can be an example of the wireless communication core 115 shown in FIG. 1.

Figure 3:
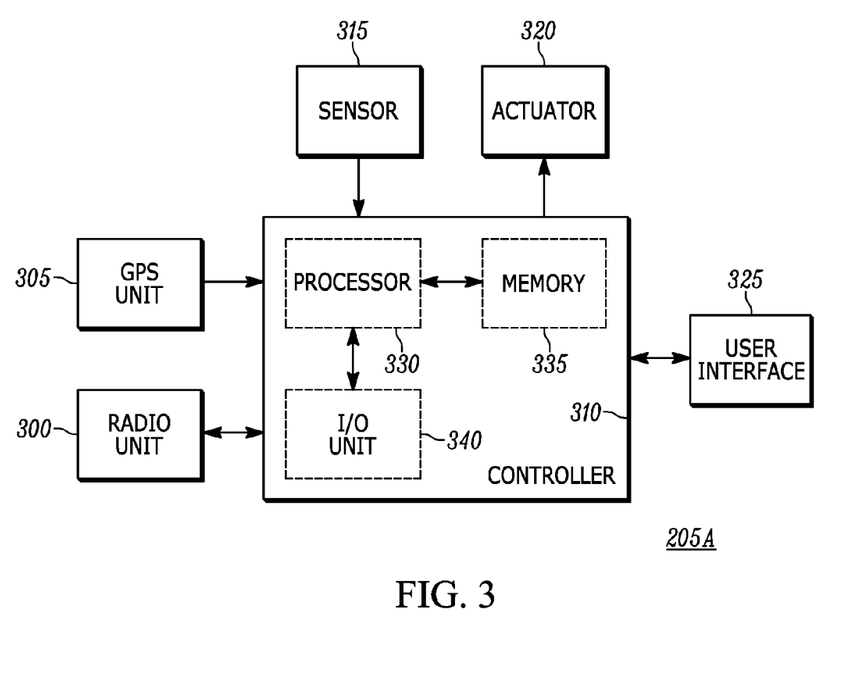
FIG. 3 is a block diagram of a remote modem device capable of operating in the system of FIG. 2.

FIG. 3 is a block diagram of the remote modem device 205A. While the remote modem device 205A is shown in FIG. 3, the figure can be applied to the second and third remote device 205B and 205C. The remote modem device 205A includes, among other components, a radio unit 300, a global positioning system (GPS) unit 305, a controller 310, a sensor 315, an actuator 320, and a user interface 325.

In one exemplary construction, the controller 310 includes, among other components, a processor 330, a memory 335, and an input/output unit 340. The memory 335 includes operational data for use by the processor 330 and program instructions for execution by the processor 330 enabling the controller 310 to control the global positioning system unit 305 to receive global positioning data, control the radio unit 300 to communicate with the land mobile radio core 210, interact with the sensor 315 for acquiring a sensed parameter, interact with the actuator 320 for opening/closing the actuator, control the user interface 325 to interface externally with an operator (e.g., a technician) or another machine (e.g., a computer or other electronic device).

More specifically in one construction, the controller 310 is populated with a plurality of electrical and electronic components that provide, power, operational control, and protection to the remote modem device 205A. The controller 310 can include, for example, a processor 330 (e.g., a microprocessor, a microcontroller, or another suitable programmable device), a memory 335, and a bus. The bus connects various components of the controller 310 including the memory 335 to the processor 330. The memory 335 includes, for example, a read only memory (ROM), a random access memory (RAM), an electrically erasable programmable read only memory (EEPROM), a flash memory, a hard disk, or another suitable magnetic, optical, physical, or electronic memory device. The processor 330 is connected to the memory 335 and executes software that is capable of being stored in the random access memory (e.g., during execution), the read only memory (e.g., on a generally permanent basis), or another non-transitory computer readable medium such as another memory or a disc. Additionally or alternatively, the memory 335 is included in the processor 330. The controller 310 also includes an input/output (I/O) unit 340 that includes routines for transferring information between components within the controller 310 and other components of the remote modem device 205A.

Software included in the implementation of the remote modem device 205A is stored in the memory 335 of the controller 310. The software includes, for example, firmware, one or more applications, program data, one or more program modules, and other executable instructions. The controller 310 is configured to retrieve from memory and execute, among other things, instructions related to the control processes and methods described herein.

The controller 310 also includes, among other things, a plurality of additional passive and active components such as resistors, capacitors, inductors, integrated circuits, and amplifiers. These components are arranged and connected to provide a plurality of electrical functions to the controller 310 including, among other things, filtering, signal conditioning, or voltage regulation.

The radio unit 300 includes, among other components, an antenna, a receiver, and a transmitter. The receiver and transmitter may be separate units or part of a transceiver that both receives and transmits data. The antenna, receiver, and transmitter enable the controller 310 to send and receive communication to and from the land mobile radio core 210 via a direct mode of operation.

The global positioning system unit 305 includes, among other components, an antenna and a receiver. The antenna and receiver enable the controller 310 to receive global positioning data from a global positioning system during operation. The receiver for the global positioning system unit 305 may use the same receiver as the radio unit 300, or be different from the receiver of the radio unit 300.

The sensor 315, which may include multiple sensors, is a device that senses a parameter (e.g., a parameter related to heat, light, sound, motion, etc.) and provides a sense signal to the controller 310. The sense signal can be a variable voltage or a state input (e.g., an open or closed state).

The actuator 320, which may include multiple actuators, is a device that provides an output (e.g., an output that may be mechanical, electrical, electromechanical, visual, audible, etc.) in response to an actuator signal from the controller 310. The actuator signal may be a variable voltage or a state output (e.g., an open or closed state).

It will be appreciated by one of ordinary skill in the art that the remote modem device 205A may have multiple sensors, multiple actuators, one sensor, one actuator, no sensors, no sensors, or combinations thereof. Also, the sensor(s) and actuator(s) may be combined in or as part of a single unit.

The user interface 325 controls the operation of the remote modem device 205A. The user interface 325 is operably coupled to the controller 310 to allow an operator or another electronic device to interact with the remote modem device 205A. The user interface 325 can include a combination of digital and analog input devices required to achieve a desired level of control for the remote modem device 205A. For example, the user interface 325 can include one or more of: a display (e.g., liquid-crystal-display screen, light-emitting diode screen, etc.); a touch-screen display; and a plurality of knobs, dials, switches, buttons, faders, or the like.

Referring back to FIG. 2, the land mobile radio core 210 is shown as including a repeater 212, a gateway 230, a router 220, a controller 225, and a server 235, all of which are generally conventional elements (except as further discussed with respect to the server) of a land mobile radio core 210. It should also be understood that the land mobile radio core 210 may include a plurality of each element shown in FIG. 2 (e.g., may include a plurality or repeaters 212 connected to the router 220) and may include other elements (e.g., a console) normally associated with a land mobile radio core 210. Also, an element (e.g., the server 235) shown as being part of the land mobile radio core 210 may be located outside of the land mobile radio core 210.

Figure 4:
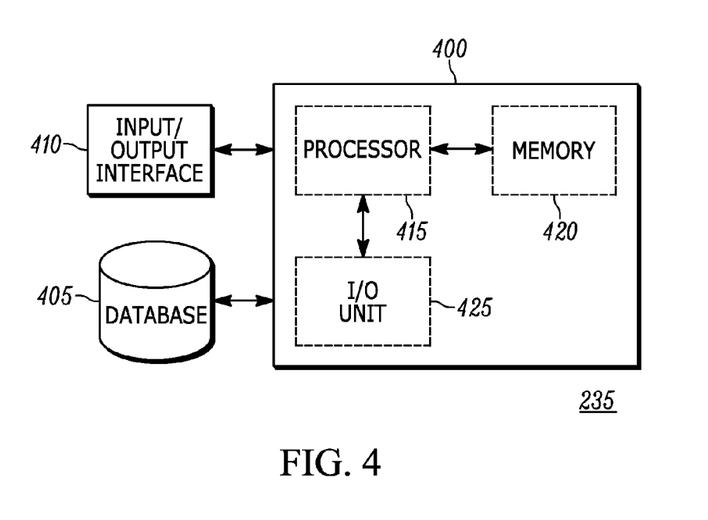
FIG. 4 is a block diagram of a server capable of operating in the system of FIG. 2.

FIG. 4 is a block diagram of the server 235. As used herein the term server is not limited to a device with a single processor, but may encompass multiple computers linked in a system, computers with multiple processors, special purpose devices, computers or special purpose devices with various peripherals and input and output devices, software acting as a computer or server, and combinations of the above.

In the construction shown in FIG. 4, the server 235 includes, among other things, a controller 400, a database 405, and an input/output interface 410. The controller 400 includes a plurality of electrical and electronic components that provide, power, operational control, and protection to the server. In some constructions, the controller 400 includes, for example, a processor 415 (e.g., a microprocessor, a microcontroller, or another suitable programmable device), a memory 420, and a bus. The bus connects various components of the controller 400 including the memory 420 to the processor 415. The memory 420 includes, for example, a read only memory (ROM), a random access memory (RAM), an electrically erasable programmable read-only memory (EEPROM), a flash memory, a hard disk, or another suitable magnetic, optical, physical, or electronic memory device. The processor 415 is connected to the memory 420 and executes software that is capable of being stored in the random access memory (e.g., during execution), the read only memory (e.g., on a generally permanent basis), or another non-transitory computer readable medium such as another memory or a disc. Additionally or alternatively, the memory 420 is included in the processor 415. The controller 400 also includes an input/output (I/O) unit 425 that includes routines for transferring information between components within the controller 400 and other components of the server 235.

Software included in the implementation of the server 235 is stored in the memory 420 of the controller 400. The software includes, for example, firmware, one or more applications, program data, one or more program modules, and other executable instructions. The controller 400 is configured to retrieve from memory and execute, among other things, instructions related to the control processes and methods described herein.

The controller 400 also includes, among other things, a plurality of additional passive and active components such as resistors, capacitors, inductors, integrated circuits, and amplifiers. These components are arranged and connected to provide a plurality of electrical functions to the controller 400 including, among other things, filtering, signal conditioning, or voltage regulation.

Referring again to FIG. 4, the controller 400 is connected to an external memory for storing information related to the processing and distribution of data, such as the database 405. The input/output interface 410 enable the server 235 to send and receive communication data to and from the server with other elements of the land mobile radio core 210, and indirectly other elements of the land mobile radio system 200.

One solution to data link congestion in machine to machine systems having links with low channel capacity is to use a form of lossless data compression, commonly called a dictionary. A dictionary coder/decoder uses the dictionary to search for matches between the data to be compressed or decompressed and a set of entries called the dictionary.

How the dictionary is created has multiple variations. Static dictionary entries may be configured into a node (e.g., a remote device 105A, a server 235, a remote modem device 205A, the wireless core 210) prior to sending data. Dynamic dictionary entries may be created during runtime. For some dynamic entries, dictionary updates may be triggered based on attributes and/or statistical analysis of the data passed between a pair of end nodes. One example of creating dynamic entries is adding an entry when the definition has been sent three times in a defined time period.

Creation of dynamic entries may or may not employ messaging between nodes to explicitly signal that a new entry is to be or has been created. For example, one approach without messaging is the creation of a new entry each time a definition is encountered that is not already in the dictionary. When messaging is used, the message may be initiated by either the sender or recipient of data. When initiated by the sender, an available identifier (also referred to as a key) may be chosen and sent along with the definition the identifier represents to the recipient. When initiated by the recipient, the definition is received from the sender, an identifier is chosen, and it is communicated back to the sender along with an optional indication of which portion of the received definition for which the identifier applies. When this process is complete, the dictionary of each node contains a new entry, including the identifier and related definition, that is available to represent data in subsequent communications between the two. In yet another possible implementation, a node (e.g., the server 235) determines which other nodes (e.g., remote modem devices 205A, 205B, and/or 205C) to share an entry with based on contextual information.

Dictionary compression is more effective when entries exist for the data most likely to be communicated through a channel between a given pair of nodes. However, a dictionary loaded with too many unused or minimally used entries cost excessive time to search and space to store. Accordingly, in some implementations, dictionaries maintained by a node of the machine to machine system 100 are kept populated with the entries that are most likely to be useful in compressing or decompressing machine to machine data sent or received by the node. One technique for evaluating the likelihood an entry is to be used is the inclusion of a context, which relates to the condition or group of conditions that will likely result in use by the dictionary coder.

Figure 5:
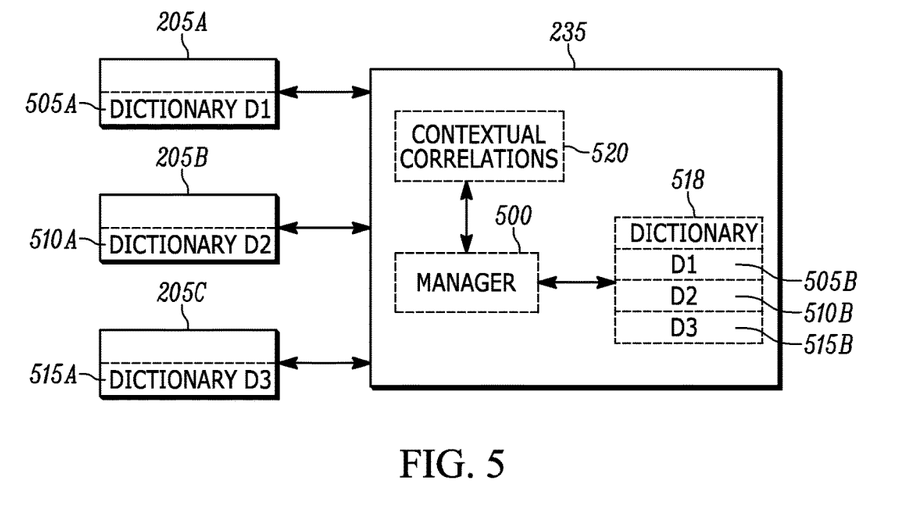
FIG. 5 is a schematic of a context-aware dictionary manager maintaining dictionaries for multiple remote modem devices according to some embodiments.

In one implementation, the server 235 executes a context-aware dictionary manager 500 (FIG. 5). The context-aware dictionary manager 500 performs at least one or more of the following actions: monitors content of all dictionaries 505, 510, 515 at various nodes; maintains the dictionaries 505, 510, and 515 in storage 518 as a dictionary database, looks for correlations among the dictionary entries and one or more pieces (i.e., a set) of contextual variables; maintains the correlations in storage 520 as a contextual correlations database, maintains with an indicator of correlation strength for each which is based at least in part on how frequently it has been observed; periodically compare current context (e.g. configuration, time) with stored context; retrieve dictionary entries most relevant or matching to current context; and establish them on the relevant link(s).

The context aware dictionary is also capable of utilizing predefined correlations between one or more contextual variables and one or more dictionary entries. Predefined correlations are configured into the system and are not based on observations of contextual information made by the context-aware dictionary manager 500. Both predefined and learned correlations are stored in contextual correlations storage 520.

Contextual information can be used in a variety of ways to populate compression dictionaries within the system. The list below contains several contexts with example dictionary optimizations.

A. Type (e.g., brand and model number) of sensor and/or actuator connected to a node (e.g., remote modem device 205A): New dictionary entries for a first link (e.g., involving remote modem device 205A and land mobile radio core 210) are shared with a second link (e.g., involving remote modem device 205B and land mobile radio 210) when both links 215A and 215B are connected to nodes having the same type of sensor and/or actuator.

B. Role of sensor(s) and/or actuator (s) within the system: First and second nodes (e.g., remote modem device 205A and remote modem device 205B) are connected to sensor(s) and actuator(s) having like roles, such as performing like operations within a system. The context-aware dictionary manager observes that links 215A and 215B have shared many of the same data in the past. The context-aware dictionary manager therefore shares new entries for either or both of the first or second nodes of link 215A with either or both of the first or second nodes of link 215B.

C. Environment of sensor(s) and/or actuator(s) within the system: a sensor or an actuator (e.g., of remote modem device 205A) is in a known environment. Dictionary entries common to these environments are added to the nodes (e.g., remote modem device 205 A and land mobile radio core 210) of the link (e.g., link 215A).

D. Time of day, month, and/or year: a device (e.g., remote modem device 205A) is used to actuate a device or utilize a sensor at a defined time of day, month and/or year. When the defined time is approaching, for example, the context-aware dictionary manager 500 loads the dictionary for communications over the link between the device and server with entries. The loaded entries include entries known to be used during the expected process.

Figure 6:
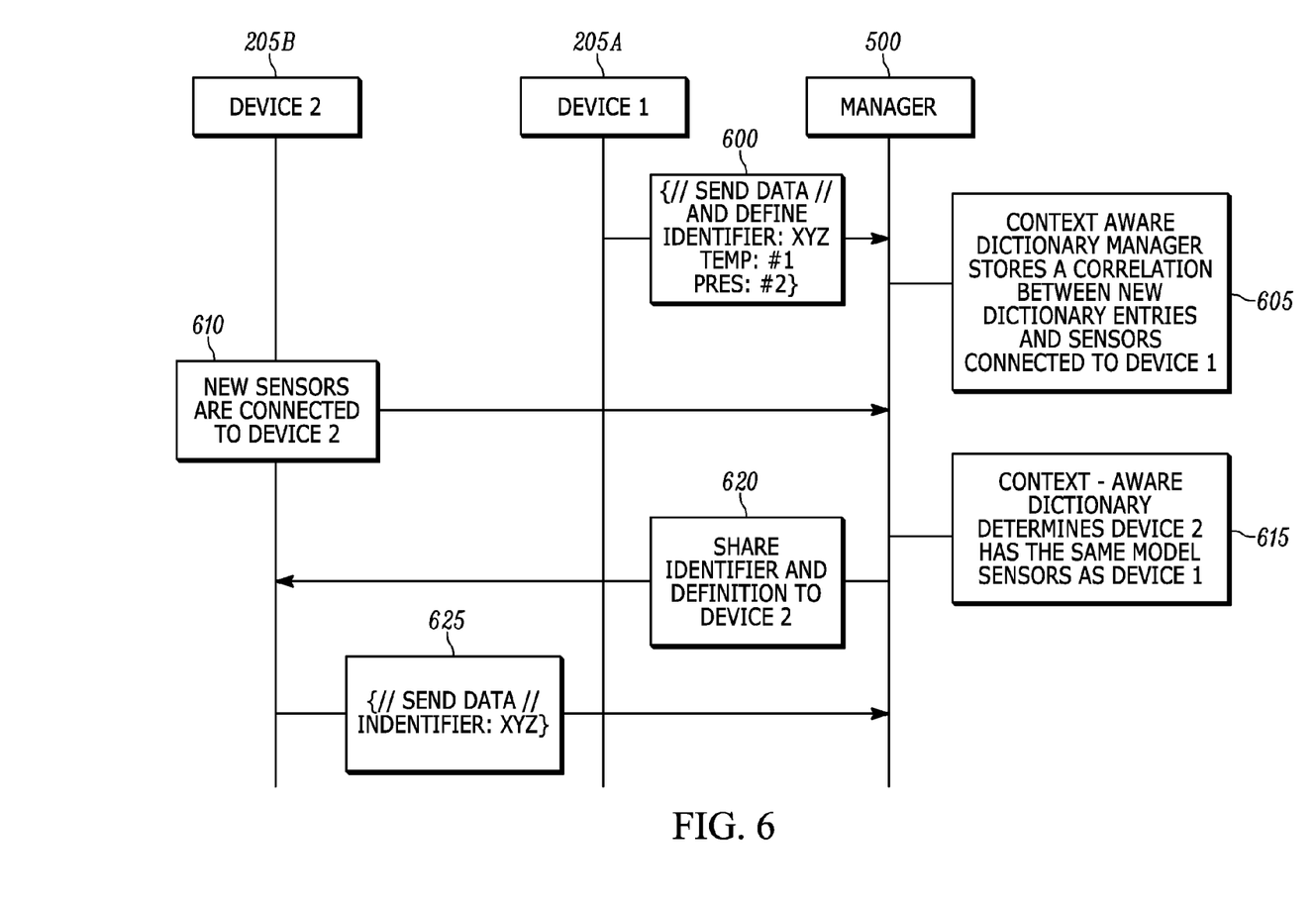
FIG. 6 is a schematic of a scenario where the context-aware dictionary manager determines that a dictionary entry used in one link should be copied to another link according to some embodiments.

FIG. 6 shows a scenario where the context-aware dictionary manager determines that a dictionary entry used on one link should be established for another link. The scenario is shown for when two remote modem devices 215A and 215B are attached to sensors of the same model number.

Remote modem device 205A includes sensor 315 of a defined type. During operation, a new dictionary entry is communicated (block 600) to the land mobile radio core 210 (e.g., repeater 212). The context-aware dictionary manager 500 of the server 235 identifies the transference of information. The context-aware dictionary manager 500 stores correlations (block 605) between the entry and the contextual information that a sensor of the defined type is connected to remote modem device 205A. The contextual information includes one or more (i.e., set) of contextual variables and their values, which are collectively a context. During installation (block 610), for example, a sensor similar to sensor 315 is attached to remote modem device 205B. As part of being connected to the system 200, the context-aware dictionary manager 500 identifies (block 615) that sensor 315 has the same model number as the sensor connected to remote modem device 205B. The context-aware dictionary manager communicates (block 620) an entry, including an identifier and definition, to the remote modem device 205B as a result of the match. In future communication, the device 205B simply sends the identifier (625) to the land mobile radio core 210.

If predefined context to dictionary correlations exist, much of the functionality described so far may be adapted for use with static dictionaries. For example, type, number, and role of sensors and actuators are likely to be known prior to system initialization and remain constant thereafter. In this case, during system initialization, the context-aware dictionary manager evaluates stored correlations in a system configuration database and uses them to construct a dictionary for each link prior to any message exchange.

In some implementations, the context-aware dictionary manager 500 can use a correlation strength indicator as part of the correlations it maintains. A positive or high correlation strength indicates that a definition is often seen in a particular dictionary or dictionaries of a node or nodes within a given context. A negative or low correlation strength indicates that a definition is often absent in a particular dictionary or dictionaries of a node or nodes within a given context.

Figure 7:
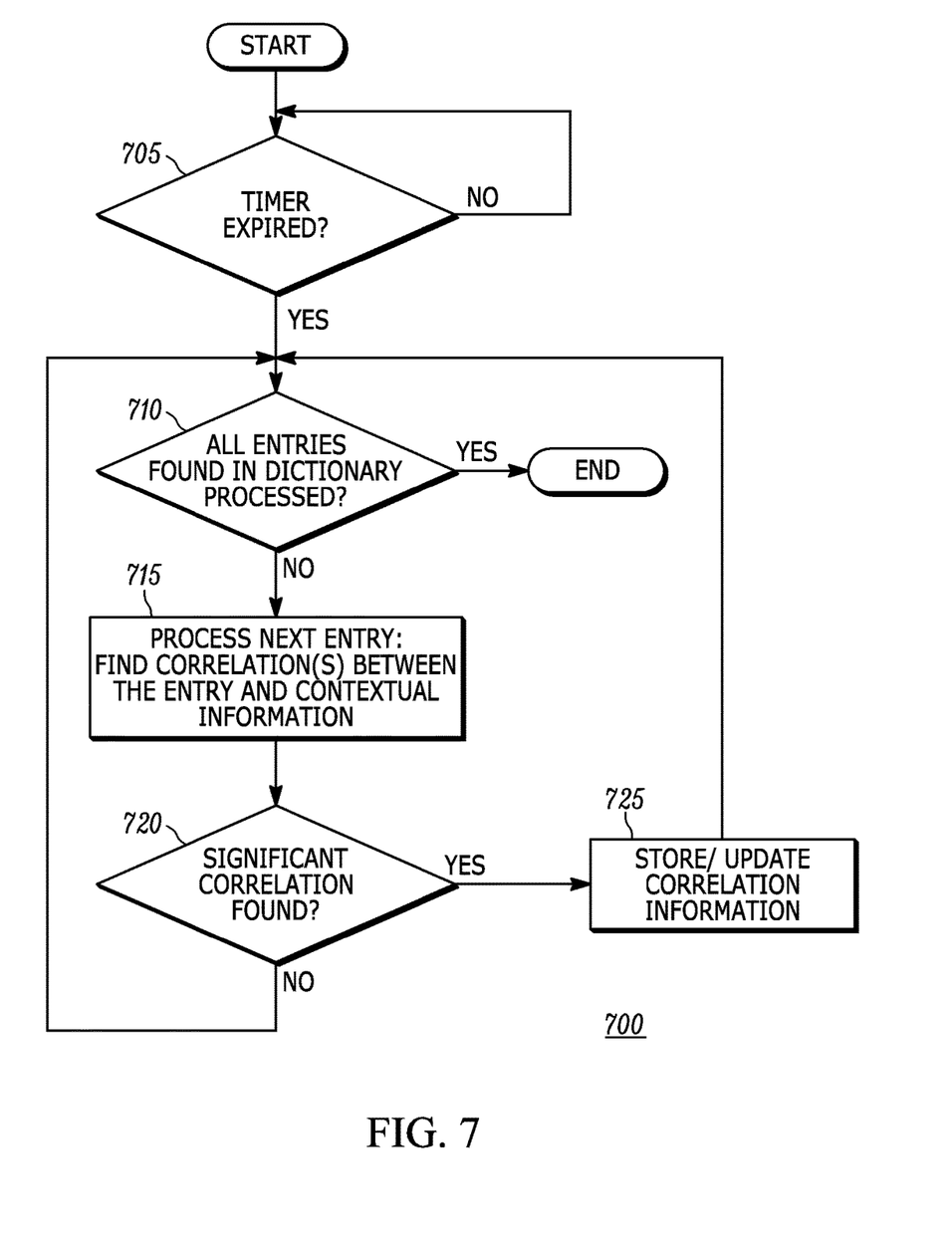
FIG. 7 is a flowchart of a method of finding and maintaining correlations by the context-aware dictionary manager in accordance with some embodiments.

FIG. 7 provides a method 700 of finding and maintaining correlations by the context-aware dictionary manager 500. At block 705, the server 235, through the use of the context-aware dictionary manager 500, checks whether a correlation refresh timer expires. The process proceeds to block 710 when the timer expires, thereby providing periodic time periods for maintaining contextual correlations at the context-aware dictionary manager 500. At block 710, the context-aware dictionary manager 500 determines whether all entries, and more specifically definitions, found in a dictionary have been processed. While block 710 is described as processing a single dictionary, a plurality of dictionaries will typically be processed. Moreover, a definition may exist in multiple dictionaries and the definition can be processed concurrently. If all entries have been processed, then the method 700 ends, otherwise the method proceeds to block 715.

At block 715, the context-aware dictionary manager 500 processes a next entry for the dictionary. For example, the context-aware dictionary manager 500 searches for and finds correlation(s) among the definition being processed and a set of contextual variables or contextual information related to the definition in the system. It is also envisioned, that multiple refresh periods can be used for finding and maintaining correlations. For a first example, "Temperature" may be the dictionary definition being processed. The context-aware dictionary manager 500 might search for and find "Temperature" in multiple dictionaries associated with links to devices having temperature sensors, thereby resulting in a significant correlation. Further examples are provided below.

At block 720, the context-aware dictionary manager 500 determines whether a significant correlation is found. If yes, then the context-aware dictionary manager 500 stores or updates correlation information including strength (block 725). If no at block 720, then the process can return to block 710.

For a first specific example, upon the timer expiring, the context-aware dictionary manager 500 may process a first dictionary entry "Temperature." The term "Temperature" may be found by the context-aware dictionary manager 500 to be in the current dictionaries associated with links to 2 of the 3 remote modem devices 205A, 205B having temperature sensors. A correlation between an entry for "Temperature" and remote modem devices connected to temperature sensors is established with a first, high strength.

On the other hand, an entry with "Temperature" is not found in the dictionaries associated with links to the remote modem devices having only pressure sensors. Snapshots or maintained data related to prior dictionary content of these remote modem devices similarly do not include dictionary definitions for "Temperature". A correlation between an entry for "Temperature" and links to the remote modem devices having pressure sensors only is established with a second, low strength. Information about correlations in these two examples is stored.

For another example, after processing "Temperature", then the next dictionary entry "Open" may be processed. An entry having definition "Open" is contained in a first set of dictionaries used over links to door controllers. Further, these door controllers opened the last five mornings. A correlation between an entry for value "Open" and 1) devices having door controllers and 2) hours in the morning is established with a third, high strength. A correlation between an entry for value "Open" and 1) devices having door controllers and 2) hours in the evening is established with a fourth, low strength.

Figure 8:
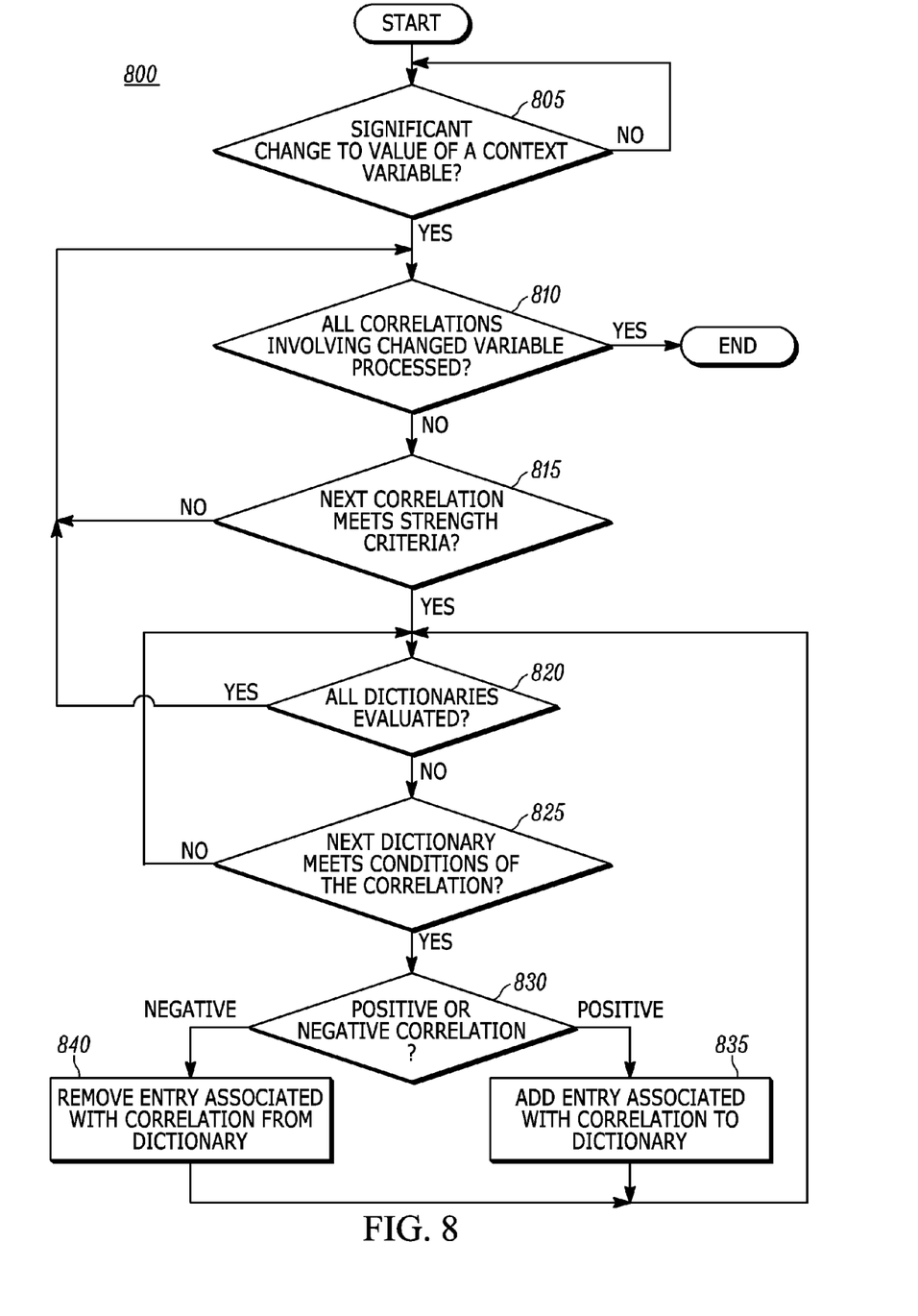
FIG. 8 is a flowchart of a method of applying correlation information in accordance with some embodiments.

FIG. 8 provides a method 800 of applying correlation information. At block 805, the context-aware dictionary manager 500 determines a significant change to the value of a contextual variable has occurred. The determination of whether a change is significant can vary depending on system configuration. If yes, the context-aware dictionary manager 500 proceeds to block 810. Next, the context-aware dictionary manager 500 determines if all correlations involving the changed value are processed (block 810). If so, then the process in FIG. 8 ends. If not, the context-aware dictionary manager 500 proceeds to block 815 to determine if a next correlation relating to the changed value meets strength criteria or whether further processing is required. If further processing is required, the process proceeds to block 820, otherwise the process returns to block 810. At block 820, the context-aware dictionary manager 500 determines whether all dictionaries have been evaluated. If yes, the process returns to block 810, otherwise, the process proceeds to block 825, which determines whether a next dictionary meets conditions of the correlation. If the decision is true in block 825, the process proceeds to block 830, otherwise the process returns to block 820. At block 830, the context-aware dictionary manager 500 determines whether a positive (or high) or negative (or low) correlation exists. If positive (or high), then the context-aware dictionary manager 500 adds the entry (e.g., identifier, definition) associated with the correlation to the dictionary (block 835). If negative (or low), then the dictionary removes the entry, if present, associated with the correlation identifier from the dictionary (block 840). The context-aware dictionary manager 500 then returns the process to block 820.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A server that communicates with a remote device in a machine to machine wireless communication network, the server comprising:
   an input/output interface;
   a processor; and
   a memory storing
      a context-aware dictionary manager executable by the processor,
      a contextual correlations database having a plurality of correlations, each correlation of the plurality of correlations including an entry and a context associated with the entry,
   the context-aware dictionary manager being configured to
      establish a current context associated with the remote device;
      search the contextual correlations database using the current context;
      identify a correlation match with the current context and one of the plurality of correlations; and communicate, via the input/output interface, the entry associated with the correlation match to the remote device for adding to a dictionary at the remote device,
wherein each entry of the plurality of correlations includes a respective identifier and a respective definition, and wherein the context-aware dictionary manager is configured to communicate the entry by communicating, via the input/output interface, an identifier and a definition associated with the correlation match to the remote device for adding to the dictionary at the remote device.

2. The server of claim 1, wherein the establishing the current context includes receiving, via the input/output interface, contextual information including a contextual variable from the remote device, and wherein the current context includes the contextual variable.

3. The server of claim 1, wherein the current context includes one or more selected from the group consisting of a type of sensor attached to the remote device, environmental information related to a sensor, a type of actuator connected to the remote device, environmental information related to an actuator, time information related to a sensor acquiring a sensed parameter, time information related to an actuator providing an output, a model of sensor, a model of actuator, a number of sensors connected to a remote device, a number of actuators connected to a remote device, a role of a sensor, a role of an actuator, a location of a sensor, and a location of an actuator.

4. The server of claim 1, wherein the server communicates with a plurality of first remote devices, the plurality of first remote devices including the remote device, each of the plurality of first remote devices include a first dictionary, respectively, including the remote device including the dictionary, wherein the server further comprises a dictionary database having a plurality of second dictionaries, wherein each second dictionary of the plurality of second dictionaries is associated with one of the first dictionary, respectively, of the plurality of first remote devices.

5. The server of claim 4, wherein the context-aware dictionary manager is further configured to update one of the plurality of second dictionaries with the entry, wherein the updated one of the plurality of second dictionaries is associated with the dictionary of the remote device.

6. The server of claim 5, wherein the remote device is associated with a link including the remote device and a second device, and the context-aware dictionary manager is further configured to communicate, via the input/output interface, the entry to the second device for adding to a third dictionary at the second device.

7. The server of claim 1, wherein the context-aware dictionary manager is further configured to
acquire information from a second remote device via the input/output interface, the information including a contextual variable, and
update the contextual correlations database with a context having the contextual variable and a related second entry.

8. The server of claim 1, wherein the context-aware dictionary manager is further configured to process a second entry from the dictionary to find a correlation with the second entry among a set of contextual variables.

9. The server of claim 8, wherein the context-aware dictionary manager is further configured to update the contextual correlations database when the correlation is a significant correlation.

10. A machine to machine communication network comprising the server of claim 1 and the remote device, wherein the remote device includes a remote modem device having at least one selected from the group consisting of a sensor and an actuator.

11. The machine to machine communication network of claim 10, wherein the remote modem device and the server communicate over a channel including a one-to-one low-capacity wireless data link.

12. The machine to machine communication network of claim 10, wherein the establishing the current context includes receiving, via the input/output interface, contextual information including a contextual variable from the remote modem device,
wherein the current context includes the contextual variable,
wherein the communicating the entry includes communicating, via the input/output interface, an identifier and a definition associated with the correlation match to the remote modem device for adding to the dictionary at the remote modem device, and
wherein the remote modem device communicates to a second device using the identifier.

13. A method of finding and maintaining correlations in a machine to machine system having a server communicating with a first remote device and a second remote device, the server implementing a context-aware dictionary manager, the method comprising:
identifying, with a processor, an entry to process;
comparing, with the processor, the entry with first contextual information associated with the first remote device and second contextual information associated with the second remote device;
finding, with the processor, a correlation among the entry, the first contextual information, and the second contextual information;
determining, with the processor, a correlation strength indicator for the correlation;
updating a contextual correlations database stored in a memory based on the correlation strength indicator;
identifying a change to a contextual variable;
identifying a correlation involving the change in the contextual correlations database;
identifying a dictionary involving the correlation; and
updating the dictionary based on the change.

14. The method of claim 13, wherein the comparing the entry includes further comparing the entry with system configuration information, and wherein the finding a correlation includes further finding the correlation with the system configuration information.

15. The method of claim 13, wherein the machine to machine system includes a plurality of remote devices, including the first remote device and the second remote device, wherein each of the plurality of remote devices includes a respective dictionary stored at the server, and wherein the finding a correlation includes finding the correlation among the respective dictionaries.

16. The method of claim 13, wherein the first remote device and the server communicate over a channel including a one-to-one low-capacity wireless data link.

17. The method of claim 13, and further comprising when the correlation strength indicator meets a strength criteria, determining whether a dictionary meets conditions of the correlation and adding an entry related to the correlation.

18. The method of claim 13, and further comprising
determining whether the correlation strength indicator meets a strength criteria to remove an entry; and when the correlation strength indicator meets the strength criteria to remove the entry, determining whether a dictionary has an entry for the correlation and removing the entry related to the correlation.

* * * * *